United States Patent [19]

Kloster

[11] 3,862,483

[45] Jan. 28, 1975

[54] SPECIAL ARBOR PRESS TOOL

[76] Inventor: Kenneth D. Kloster, 5153 Rambo Ln., Toledo, Ohio 43623

[22] Filed: Oct. 10, 1972

[21] Appl. No.: 296,303

[52] U.S. Cl. .................................... 29/257, 29/263
[51] Int. Cl. ........................................... B26p 19/02
[58] Field of Search ............ 29/251, 256, 257, 258, 29/263, 260; 269/249

[56] References Cited
UNITED STATES PATENTS

| | | | |
|---|---|---|---|
| 2,235,643 | 3/1941 | Pfauser | 29/257 X |
| 2,641,378 | 6/1953 | Wilt | 29/256 UX |
| 3,102,333 | 9/1963 | Thornton et al. | 29/257 |
| 3,200,484 | 8/1965 | Garman | 29/263 |
| 3,237,291 | 3/1966 | Kelso | 29/257 |
| 3,745,637 | 7/1973 | Rutherford | 29/263 X |
| 3,785,050 | 1/1974 | Whitledge et al. | 29/263 X |

*Primary Examiner*—Al Lawrence Smith
*Assistant Examiner*—K. J. Ramsey

[57] ABSTRACT

A hand tool for removing and inserting ball and socket joint assemblies from Volkswagen vehicle front suspension arms without removal of these arms from the vehicle comprising: a side windowed tubular arbor press barrel having an annular suspension arm engaging mandrel at one end and a tapped head at the other end for a drive screw, which drive screw has a wrench engaging head at its outer end and a thrust bearing at its inner end that engages selectively any one of three separate mandrels — one for extraction of the joint assemblies, and the other two for the insertion of the joint assemblies in the upper arm assembly and lower arm assembly, respectively. Each of these mandrels comprises a cylindrical member having a boss at one end which seats on the thrust bearing and a rim at the other end for engagement with the peripheral edge of the different joint assemblies, and a hollow center inside the rim for receiving the projecting parts of the joint assemblies.

7 Claims, 8 Drawing Figures

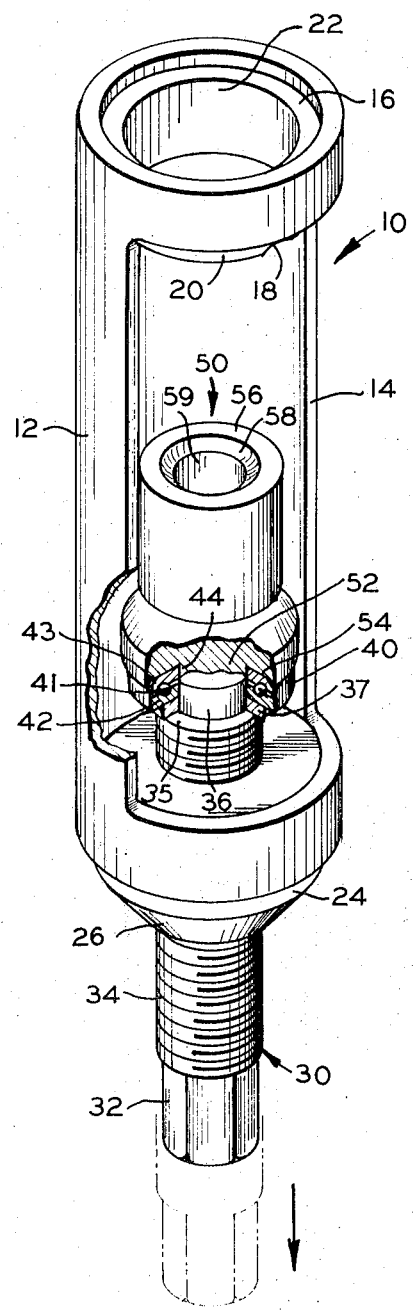
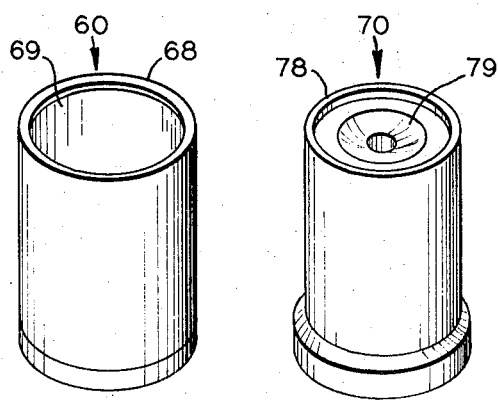
FIG. 2  FIG. 3  FIG. 4

3,862,483

SPECIAL ARBOR PRESS TOOL

BACKGROUND OF THE INVENTION

Previously the ball and socket joint assemblies for the front suspension arms of Volkswagen vehicles could only be removed by removing the front suspension arms, which required not only the detachment of the front wheels of the vehicle but also all of the devices attached to these arms including the shock absorber and sway and torsion bar. All this required several hours of work so that the press-fitted ball and socket joint assemblies could be pushed out by a special tool in a remotely located bench-mounted arbor press and the new assemblies inserted therein. The actual time of removing and inserting the joint assemblies was comparable short to the time required for removing and replacing the suspension arms.

SUMMARY OF THE INVENTION

Generally speaking the tool of this invention comprises a portable hand manipulated arbor press having replaceable special easily fit therein for insertion and extraction of the different upper and lower suspension arm ball and socket joint assemblies for a vehicle, particularly those of a Volkswagen vehicle. More particularly, this tool comprises a cylindrical tubular body having a window substantially throughout one half side thereof into which a mandrel and an end of a suspension arm including a ball and socket joint assembly can be easily inserted. At one end of this tubular body is provided a seat with a notch therein for the suspension arm and its assembly supporting end, which seat has a central aperture sufficiently large so that the ball and socket assembly may pass easily therethrough. The other end of the tubular body comprises a tapped or internally threaded head into which a drive screw fits to force the removal and insertion of the press-fit assemblies from and into the suspension arms. The outer end of this drive screw is provided with a hex or other type nut end that can be engaged by a standard wrench or other lever means for operating the screw, and its inner end is provided with a collar and thrust bearing for seating different mandrels that fit either side of the different ball and socket joint assemblies for their insertion and extraction. In the particular application involved herein there are provided three different types of mandrels, one for the extraction of both the upper and lower suspension arm ball and socket assemblies for a Volkswagen vehicle, and the other two for the insertion of the two different upper and lower ball and socket assemblies. Each mandrel is provided at one end with a central boss portion that fits into the center of the thrust bearing, and has at its other end an annular edge or rim formed to fit near the peripheral edge of the joint assembly for forcing it out of or into its suspension arm support, and having inside of this rim a sufficient cavity or hollow to receive freely the projecting parts of the joint assembly.

Accordingly it is an object of this invention to produce a simple, efficient, effective, and economical portable and readily adaptable arbor press tool.

Another object is to provide such a tool which reduces the time required for the changing of ball and socket assemblies for the front suspension of vehicles at least to one quarter of that time required for performing this job when the suspension arms had also to be removed from the vehicle for the replacement of these assemblies.

Another object of this invention is to provide such a portable tool which can be used for several different types of assemblies by merely changing the mandrels that are used therewith.

BRIEF DESCRIPTION OF THE INVENTION

The above mentioned and other features, objects, and advantages, and the manner of obtaining them are described more specifically below by reference to an embodiment of this invention shown in the accompanying drawings, wherein:

FIG. 2 is an enlarged perspective view of the tool of this invention shown in FIG. 1 with the mandrel for the removal of a ball and socket joint assembly positioned therein, and with parts broken away to illustrate more specifically the fitting of this mandrel onto the thrust bearing at the inner end of the drive screw;

FIG. 3 is a perspective view of one of the other mandrels for this tool shown in FIG. 2 for the insertion of a ball and socket joint assembly into the upper vehicle suspension arm;

FIG. 4 is a perspective view similar to FIG. 3 of the third mandrel for this tool shown in FIG. 2 for the insertion of a ball and socket joint assembly in a lower vehicle suspension arm;

DETAILED DESCRIPTION OF A PREFERRED EMBODIMENT

Figure 1:
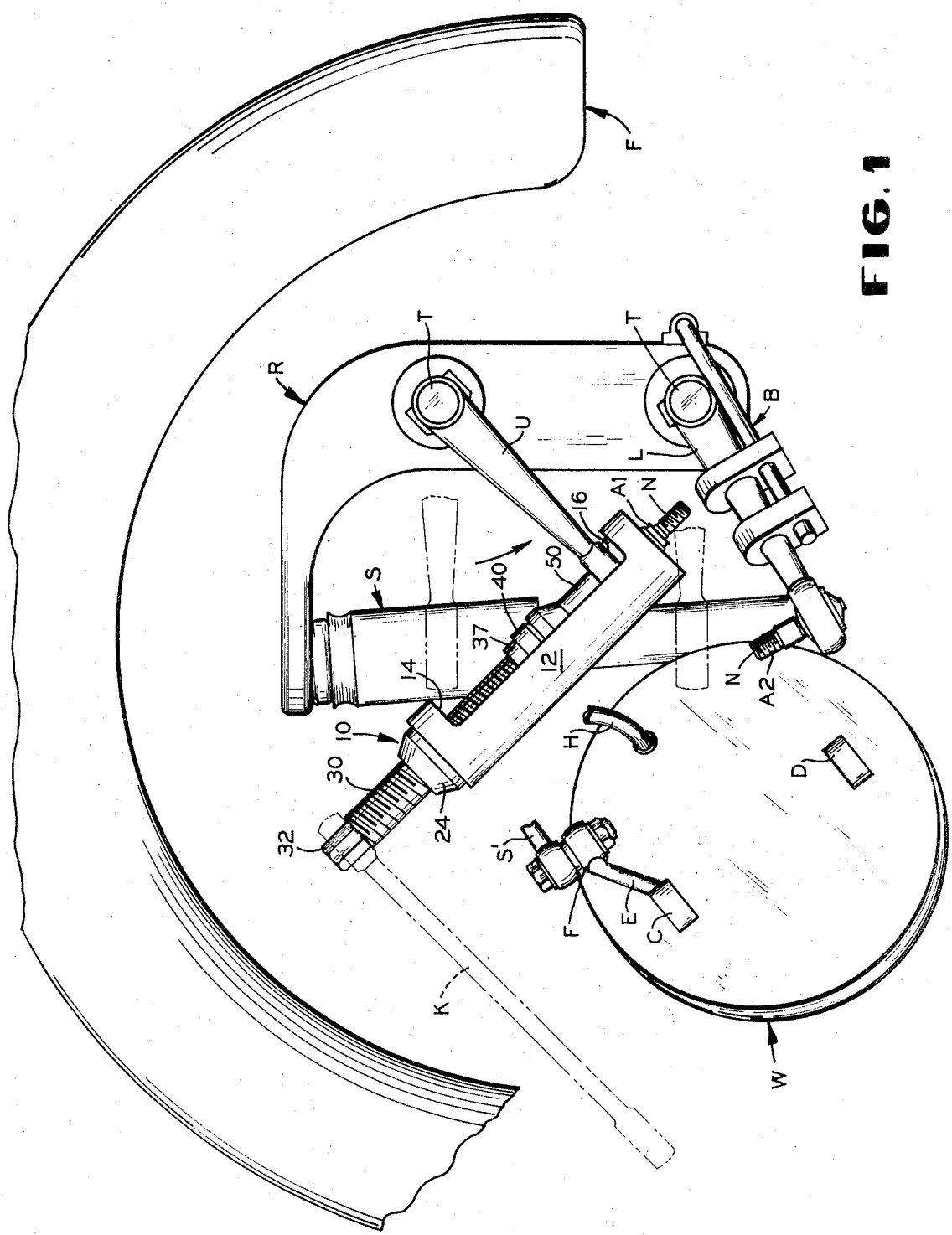
FIG. 1 is a perspective view of a right front end of a Volkswagen vehicle showing the wheel removed from its brake drum, and its two suspension arms with a tool according to this invention mounted on the end of the upper arm for removal of the ball and socket joint assembly therefrom without the removal of any of the connections of these arms.

Referring first to FIG. 1, there is shown in part the front right fender F of a Volkswagen vehicle under which is shown part of a frame R into which are journalled the upper and lower wheel suspension arms U and L to the lower one of which is connected shock absorber S and stabilizer rod B. There is also shown the brake drum and wheel mounting W from which the wheel has been removed, but the duct H for the hydraulic brake fluid still is connected thereto, as is the bracket E for supporting the joint connection F of the steering rod S'. Also on the back of this brake drum mounting W there are mounted the upper and lower sockets C and D, respectively, through which the threaded necks N of the ball and socket joint assemblies A1 and A2 for the upper and lower suspension arms U and L are connected when assembled. The journalled ends of the suspension arms U and L are connected to torsion bars T that extend transversely of the vehicle.

Also shown in FIG. 1 is a preferred embodiment of the tool 10 of this invention attached to the socket end of the upper suspension arm for the removal of the ball and socket joint assembly A1 therefrom. A wrench K is shown in dot-dash lines on the hexagonal outer end 32 of the drive screw 30 of the tool 10 for operating the screw to force out the assembly A1 from its press fit in the annular ring or socket end of the upper lever arm U.

Referring now to FIGS. 2, 3 and 4, the tool 10 is shown together with the three mandrels employed therewith for the extraction and insertion of the ball and socket joint assemblies A1 and A2 for the front suspension arms U and L of the vehicle shown in FIG. 1. This portable arbor press tool 10 comprises a tubular barrel portion 12 having a window or opening 14 extending most of the length of and around one half side thereof, so that easy access can be had to the center of the tube for insertion of the mandrels and the socket ends of the suspension arms U and L. At one end of this tubular member or barrel portion 12 there is integrally attached thereto, such as by welding, a suspension arm mandrel ring or seat 16 having a notch 18 in its inner rim 20, which notch 18 seats the arms U and L when its socket end seats in the rim 20 (see also FIGS. 5 through 8). The center of this ring 16 is open to provide an aperture 22 sufficiently large for the assemblies A1 and A2 to easily pass therethrough without obstruction.

At the other end of the tubular arbor housing or barrel portion 12, there is welded therein an internally threaded or tapped head portion 24, which may have a tapered or frusto-conical upper outer surface 26. Through this internally threaded hole, the drive screw 30 is threaded for forcing the assemblies A1 and/or A2 in and out of their sockets at the ends of the suspension arms U and L. The outer end of this drive screw 30 is provided with a hexagonal or other bolt or nut shaped head 32 upon which a standard wrench K or other lever means may easily be fitted for turning the screw 30. The threads 34 of this screw 30 are preferably smooth or rolled so as not to bind in the threaded hole of the head 24. At the inner end of the drive screw 30 there is provided a shoulder 35 and neck portion 36 on and around which fits a washer or collar 37 of sufficient diameter so that the thrust of the screw will be directed around the ball raceways 41 of thrust bearing 40, the inner portion 42 of which force fits on the neck 36 with the washer 37 to be attached to the drive screw 30. The outer portion 43 of the thrust bearing 40 extends beyond the end of the neck 36 so as to be freely rotatable relative to the other portion 42 attached to the screw 30. A central aperture 44 in this outer portion or half 43 of the bearing 40 centers and seats the boss ends 52, 62 and 72 of each of the mandrels 50, 60 and 70, respectively.

Figure 5:
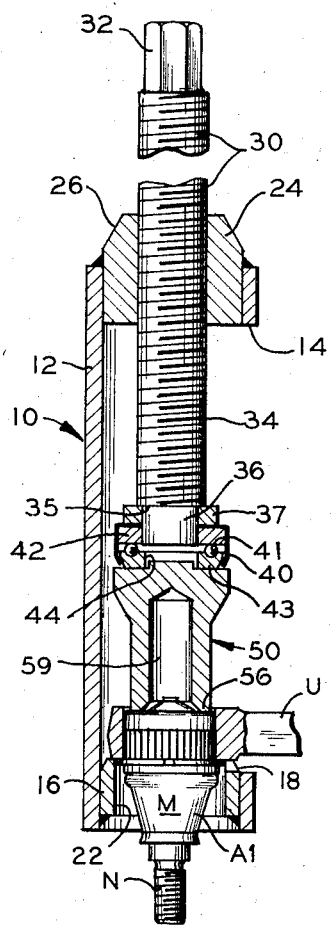
FIG. 5 is a vertical sectional view of the tool shown in FIG. 2 in position for the removal of a joint assembly from an upper suspension arm, with parts of the arm and too being broken away.
Figure 7:
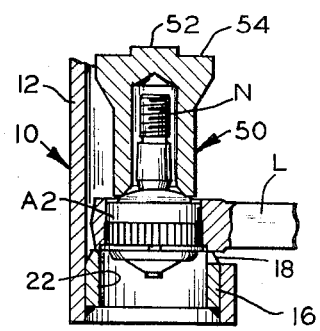
FIG. 7 is a view similar to FIG. 6 showing the tool of this invention with the mandrel shown in FIGS. 3 and 5 for removing a joint assembly from a lower suspension arm.

In FIG. 2 the substantially cylindrical mandrel 50 for removing the assemblies A1 and A2 is shown in place on the thrust bearing 40, with its central boss portion 52 fitting into the aperture 44 of the outer half 43 of the thrust bearing 40, but not contacting the neck 36 so as to be freely rotatable relative thereto. Around this boss portion 52 is provided an annular portion 54 which engages and presses against the outer face of the outer half 43 of the thrust bearing 40. At the other end of this cylindrical mandrel 50 is a rim 56 that has an inwardly bevelled portion 58, and a central aperture 59 so as to receive without contact the neck portion N of the lower assembly A2 as shown in FIG. 7, as well as to receive the domed other end of the assembly A1 shown in FIG. 5. This rim portion 56 presses against the assembly A1 or A2 near its periphery to force it out of its socket in the suspension arm U or L as the screw 30 is turned, and as is shown in FIGS. 5 and 7.

Figure 6:
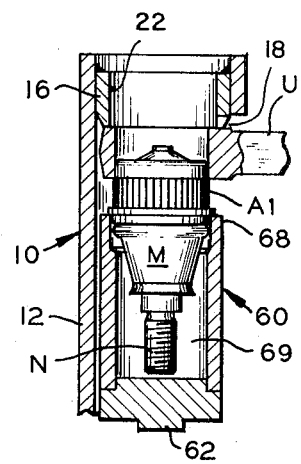
FIG. 6 is a view of the same tool with parts broken away being used in the opposite direction with the mandrel shown in FIG. 3 for the insertion of a new joint assembly into a upper suspension arm.

The mandrel 60 shown in FIG. 3 is employed for inserting the upper ball and socket joint assembly A1 in the socket in arm U and also is cylindrical in shape having at one end thereof a boss portion 62 (see FIG. 6) which fits into the center 44 of the outer portion 43 of the thrust bearing 40. The other end of this mandrel 60 has a contact rim 68 which engages the edge of the ball and socket assembly A1 for pushing it into the socket end of the upper lever arm U as shown in FIG. 6. The center portion of this mandrel 60 is hollow to provide a sufficiently large aperture 69 into which the neck N and the remaining adjacent portion of the assembly A1 can easily be received without contact or interferring with a rubber skirt M covering the ball joint.

Figure 8:
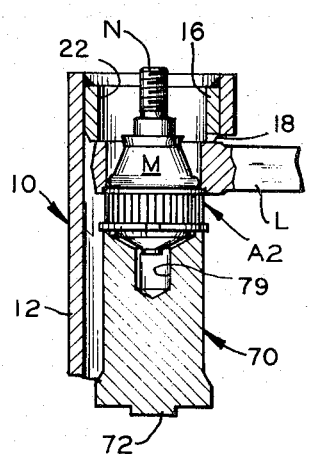
FIG. 8 is a view similar to FIG. 6 showing the tool of this invention with the mandrel shown in FIG. 4 for the insertion of a joint assembly in a lower suspension arm.

In FIG. 4 is disclosed the other cylindrical mandrel 70 which is used for inserting the lower ball and socket joint assembly A2 as shown in FIG. 8. It also comprises a boss 72 at one end thereof for fitting into the outer portion 43 of the thrust bearing 40, and has at its other end a rim portion 78 which engages the outer edge of the assembly A2, and has a central hollow portion 79 to provide adequate room for receiving the domed end of the assembly A2 as more specifically shown in FIG. 8.

Thus, by placing the tool 10 over the end of the upper and/or lower suspension arms U and L as shown in FIGS. 1 and 5 through 8, and employing the proper mandrels 50, 60 and 70, the ball and socket joint assemblies in the ends of these arms U and L may be easily removed and/or inserted in their press fit connections without disconnecting and removing the arms U and L from the vehicle. Accordingly, the time required for replacing these ball and socket joint assemblies A1 and A2 in a vehicle is materially reduced because such can be done with very little disconnection of the parts of the front end of the vehicle.

Although the tool 10 is for one specific purpose, namely the removal of ball and socket joint assemblies which have a press fit in the suspension arms of the front wheels of a particular type of vehicle, this tool may be readily adapted as a portable arbor press for the removal and insertion of many other different press fit parts in a vehicle or other machine, without completely disassembling that vehicle or machine, provided the proper mandrels 16, 50, 60 and 70 are provided therefor for cooperating with such parts. Thus while there is described above the principals of this invention in connection with a specific tool 10, it is to be clearly understood that this description is made only by way of example and not as a limitation to the scope of this invention.

I claim:

1. A portable tool for insertion and removing press fit parts in an aperture of an arm, comprising:

A. an arbor press comprising:

1. an open sided tubular housing having an annular arm engaging mandrel at one end thereof and a tapped hole in its other end,
2. a drive screw threaded in said tapped hole having a lever engageable outer end and a shank at its other end,
3. a thrust bearing at its inner end having two parallel annular relatively rotatable members, one of which members has its inner cylindrical surface fixedly attached with an interference fit to the exterior surface of said shank end; and B. a cylindrical mandrel having a cylindrical boss at one end thereof seatable in the central aperture of said other annular member of said thrust bearing in said press, said mandrel having a seat portion at its other end for engaging said part.

2. A tool according to claim 1 including a plurality of cylindrical mandrels each having said bosses at one end for engagement with said thrust bearing, and having rims at their opposite ends for engagement with different press-fit parts.

3. A tool according to claim 2 including separate mandrels for inserting and removing the same part from the aperture in the arm.

4. A tool according to claim 1 wherein said drive screw has a wrench engageable outer end.

5. A tool according to claim 1 wherein said arm engaging mandrel has a cut-out portion adjacent the open side of said housing.

6. A tool according to claim 1 wherein said drive screw includes a neck at said thrust bearing end, a washer around said neck, and said thrust bearing engages said washer and is attached to said neck.

7. A portable tool for inserting and removing ball and socket joint assemblies from the front suspension arms of a vehicle without the removal of said arms from the vehicle, comprising:

A. an arbor press comprising:
1. a tubular barrel having a central half open side, a suspension arm engaging annular mandrel in one end thereof, and an internally threaded head in the other end thereof,
2. a drive screw threaded through said head having a wrench engaging bolt type outer end and an inwardly disposed support end, and
3. a centrally apertured thrust bearing partly surrounding said support end and fixed thereto; and B. three different cylindrical mandrels, each having a boss portion at one end for removably seating in the aperture of the other side of said thrust bearing, and each mandrel having a rim portion at its other end for engaging the ball and socket joint assemblies, one mandrel being adapted for engaging and removing said assemblies from said suspension arms and the other two mandrels being for engaging and insertion of said assemblies in the upper and lower suspension arms, respectively.

* * * * *

UNITED STATES PATENT OFFICE
CERTIFICATE OF CORRECTION

PATENT NO. : 3,862,483

DATED : Jan. 28, 1975

INVENTOR(S) : Kenneth D. KLOSTER

It is certified that error appears in the above-identified patent and that said Letters Patent are hereby corrected as shown below:

Column 1, line 17, 'ble" should - - bly - -

Column 1, line 23, after "special" insert - - mandrels that - -

Column 2, line 38, "too" should be - - tool - -

Column 2, line 42, "a" should be - - an - -

Column 4, line 59, "principals" should be - - principles - -

Signed and sealed this 27th day of May 1975.

(SEAL)
Attest:

RUTH C. MASON
Attesting Officer

C. MARSHALL DANN
Commissioner of Patents
and Trademarks